United States Patent
Kita et al.

(10) Patent No.: US 7,285,361 B2
(45) Date of Patent: *Oct. 23, 2007

(54) NON-AQUEOUS SECONDARY BATTERY AND PORTABLE EQUIPMENT USING THE SAME

(75) Inventors: Fusaji Kita, Ibaraki (JP); Hideo Sakata, Kyoto (JP); Haruki Kamizori, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/398,563

(22) Filed: Apr. 6, 2006

(65) Prior Publication Data

US 2006/0183021 A1    Aug. 17, 2006

Related U.S. Application Data

(62) Division of application No. 10/468,381, filed as application No. PCT/JP02/13277 on Dec. 19, 2002.

(30) Foreign Application Priority Data

Dec. 21, 2001  (JP) .............................. 2001-389967

(51) Int. Cl.
    *H01M 6/16*  (2006.01)
(52) U.S. Cl. ...................... 429/327; 429/326; 429/329; 429/340; 429/336; 429/199; 429/232
(58) Field of Classification Search ................ 429/326, 429/327, 328, 329, 336, 340, 232, 199
See application file for complete search history.

(56) References Cited

U.S. PATENT DOCUMENTS

| | | | |
|---|---|---|---|
| 5,776,627 A | 7/1998 | Mao et al. | |
| 5,879,834 A | 3/1999 | Mao | |
| 6,200,706 B1 | 3/2001 | Ashida et al. | |
| 6,573,004 B1 | 6/2003 | Igarashi et al. | |
| 2004/0121239 A1 | 6/2004 | Abe et al. | |

FOREIGN PATENT DOCUMENTS

| | | | |
|---|---|---|---|
| EP | 0 746 050 A1 | | 12/1996 |
| EP | 1 065 744 A2 | | 1/2001 |
| JP | 5-36439 A | | 2/1993 |
| JP | 7-302614 A | | 11/1995 |
| JP | 8-321313 A | | 12/1996 |
| JP | 9-106835 A | | 4/1997 |
| JP | 9-171840 A | | 6/1997 |
| JP | 11-40193 A | | 2/1999 |
| JP | 2000-156243 | * | 6/2000 |
| JP | 2000-156243 A | | 6/2000 |
| JP | 2000-215871 A | | 8/2000 |
| JP | 2000-215909 A | | 8/2000 |
| JP | 2000-223150 A | | 8/2000 |
| JP | 2001-15155 A | | 1/2001 |
| JP | 2001-57239 A | | 2/2001 |
| JP | 2001-185213 A | | 7/2001 |
| JP | 2002-110229 A | | 4/2002 |
| JP | 2002-298910 A | | 10/2002 |
| JP | 2002-313415 A | | 10/2002 |
| KR | 1998-703445 A | | 11/1998 |
| KR | 2001-017536 | | 3/2001 |
| KR | 2001-0031915 A | | 4/2001 |

* cited by examiner

*Primary Examiner*—Laura Weiner
(74) *Attorney, Agent, or Firm*—Birch, Stewart, Kolasch & Birch, LLP

(57) ABSTRACT

A non-aqueous secondary battery includes a positive electrode, a negative electrode, and a non-aqueous electrolyte solution where the non-aqueous electrolyte solution contains a compound A in which a halogen group is bonded to a benzene ring and a compound B oxidized at a potential lower than that of the compound A, and the compound B is at least one selected from an aromatic compound and a heterocyclic compound. Thus, a non-aqueous secondary battery having excellent overcharging safety and being capable of ensuring storage reliability with less generation of gas during storage at a high temperature can be provided.

17 Claims, 1 Drawing Sheet

NON-AQUEOUS SECONDARY BATTERY AND PORTABLE EQUIPMENT USING THE SAME

This application is a Divisional of co-pending application Ser. No. 10/468,381 filed on Aug. 19, 2003 and for which priority is claimed under 35 U.S.C. § 120. Application Ser. No. 10/468,381 is the national phase of PCT International Application No. PCT/JP02/13277 filed on Dec. 19, 2002 under 35 U.S.C. § 371. The entire contents of each of the above-identified applications are hereby incorporated by reference.

TECHNICAL FIELD

The present invention relates to a non-aqueous secondary battery having improved overcharging safety of the battery and being capable of ensuring storage reliability thereof, and portable equipment using the same.

BACKGROUND ART

The demand for non-aqueous secondary batteries such as a lithium-ion battery is increasing year after year due to a need for high voltage and high energy density. However, while the energy density of a battery is increased, the safety thereof is decreased. Therefore, the enhancement of safety is important in batteries with high energy density. Furthermore, implementing typical safety measures, the energy density tends to decrease. Therefore, there is a demand for measures in which safety is improved while energy density is maintained.

Conventionally, a special additive is contained in an electrolyte solution of a non-aqueous secondary battery to ensure overcharging safety. As an additive to an electrolyte solution, which is polymerized under a high voltage to improve safety during overcharging, biphenyl described in JP 9(1997)-171840 A, cyclohexylbenzene described in JP 2001-015155 A, and the like have been proposed. These additives generate gas during overcharging to facilitate the operation of a current interrupting valve. Thus, these additives ensure safety in combination with a current interrupting valve. However, a prismatic battery is not usually provided with a current interrupting valve, so that the effect of an additive cannot be exhibited sufficiently. Furthermore, when a large amount of an additive to the electrolyte solution is used, particularly, in combination with a positive electrode having a large surface area, the stability of the additive in a charged state is decreased. When this state is left at a high temperature for a long period of time, the electrolyte solution is decomposed and the like, which is likely to cause a battery to expand and an internal resistance to increase. Due to the gas generated at this time, the internal pressure is increased in the case of a prismatic battery, and battery expansion occurs in the case of a prismatic battery and a laminated battery. Particularly, in the prismatic battery and the laminated battery, the apparent size is changed.

On the other hand, when fluorobenzene or the like is used as an additive to the electrolyte solution, a battery is unlikely to expand and the like, although the addition of a small amount of fluorobenzene or the like has a small effect on overcharging since fluorobenzene itself is stable under a high voltage. For example, when the added amount of fluorobenzene is increased, overcharging performance becomes better; however, the effect of the increased added amount is not so high as that of cyclohexylbenzene.

DISCLOSURE OF INVENTION

The present invention has been achieved for the purpose of solving the above-mentioned conventional problems, and provides a non-aqueous secondary battery having excellent overcharging safety and being capable of ensuring storage reliability with less generation of gas during storage at a high temperature.

A non-aqueous secondary battery of the present invention includes a positive electrode, a negative electrode, and a non-aqueous electrolyte solution, wherein the non-aqueous electrolyte solution contains a compound A in which a halogen group is bonded to a benzene ring and a compound B oxidized at a potential lower than that of the compound A, and the compound B is at least one selected from an aromatic compound and a heterocyclic compound.

Furthermore, portable equipment of the present invention includes a non-aqueous secondary battery, wherein the non-aqueous secondary battery includes a positive electrode, a negative electrode, and a non-aqueous electrolyte solution, the non-aqueous electrolyte solution contains a compound A in which a halogen group is bonded to a benzene ring and a compound B oxidized at a potential lower than that of the compound A, and the compound B is at least one selected from an aromatic compound and a heterocyclic compound.

Other aspects and advantages of the invention will be apparent from the following description and the appended claims.

BEST MODE FOR CARRYING OUT THE INVENTION

Figure 1:
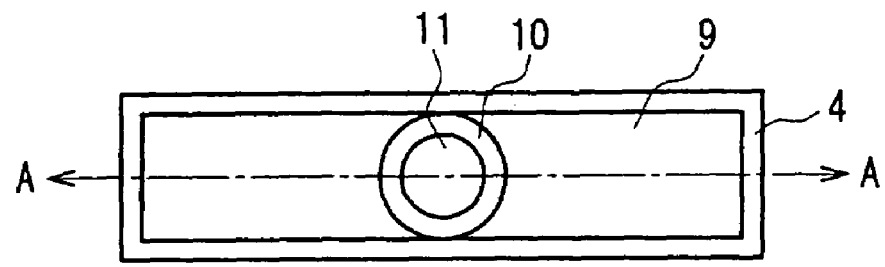
FIG. 1 is a plane view schematic showing an example of a non-aqueous secondary battery according to the present invention.

Hereinafter, the present invention will be described by way of embodiments.

One embodiment of the present invention is a non-aqueous secondary battery that contains, in an electrolyte solution, a compound A in which a halogen group is bonded to a benzene ring and a compound B oxidized at a potential lower than that of the compound A, wherein the compound B is at least one selected from an aromatic compound and a heterocyclic compound. Because of the interaction between the compounds A and B, overcharging safety and storage reliability can be realized.

For the compound A, fluorobenzene, difluorobenzene, trifluorobenzene, chlorobenzene, or a derivative thereof is preferable. Compounds in which a halogen group is bonded to an aromatic ring may be used, such as cyclohexylbenzene, isopropylbenzene, n-butylbenzene, octylbenzene, toluene, xylene, and the like. For a halogen group, in particular, fluorine is desirable. Furthermore, a non-ionic compound is desirable as the compound A. Among them, fluorine-substituted benzene, in particular, fluorobenzene is preferable.

The content of the compound A is desirably 1% by mass or more, more desirably 2% by mass or more, and most desirably 3% by mass or more in an electrolyte solution. Furthermore, the content of the compound A is desirably 15% by mass or less, more desirably 10% by mass or less, and most desirably 7% by mass or less in an electrolyte solution.

Furthermore, the compound B is at least one selected from an aromatic compound and a heterocyclic compound oxidized at a potential lower than that of the compound A. For example, in the case where the compound A is fluorine-substituted benzene, examples of the compound B include biphenyl, methylpyrrole, diphenylmethane, diphenylether, naphthalene, furan, and the like. Those which have an aromatic ring are particularly desirable, and biphenyl is preferable.

The ratio of the compound B to the compound A is desirably 20% by mass or less, more desirably 15% by mass or less, and most desirably 10% by mass or less. Furthermore, the ratio of the compound B to the compound A is desirably 0.5% by mass or more, more desirably 1% by mass or more, and most desirably 2% by mass or more.

Although the detail of the interaction between the compounds A and B is not clear, it is assumed as follows. The compound B is oxidized at a potential lower than that of the compound A. Therefore, the compound B reacts with an active site of a positive electrode prior to the compound A during charging to form for a thin coating. Because of the thin coating, the compound A is likely to react in a uniform state on the electrode during overcharging, whereby overcharging performance is enhanced. When the amount of the compound B is increased, the compound B influences the expansion of a battery and the increase in impedance. Therefore, the content of the compound B with respect to the total non-aqueous electrolyte solution is desirably 3% by mass or less, more desirably 0.5% by mass or less, and most desirably 0.2% by mass or less. Furthermore, when the content of the compound B is too small, the compound B cannot form a sufficient coating. Therefore, the content of the compound B is desirably 0.005% by mass or more, more desirably 0.05% by mass or more, and most desirably 0.1% by mass or more.

Furthermore, it is preferable that a compound having a —$SO_2$— bond is contained in the electrolyte solution. In particular, it is more preferable that a compound having a —O—$SO_2$— bond is dissolved in the electrolyte solution. Examples of the compound having a —O—$SO_2$— bond include 1,3-propanesultone, methyl ethyl sulfonate, diethyl sulfate, and the like. The content thereof is desirably 0.5% by mass or more, more desirably 1% by mass or more, and most desirably 2% by mass or more. Furthermore, the content of 10% by mass or less is desirable, 5% by mass or less is more desirable, and 3% by mass or less is most desirable. Because of the addition of this compound, the safety during overcharging is enhanced further.

As an electrolyte, an organic electrolyte solution may be used, or an electrolyte using a polymer or a solid may be used. In any case, it is necessary that the electrolyte contains at least an organic solvent (non-aqueous electrolyte solution). As the organic electrolyte solution, esters can be used mainly, such as carbonic acid esters (e.g., ethylene carbonate (EC), propylene carbonate (PC), butylene carbonate (BC), dimethyl carbonate (DMC), methyl ethyl carbonate (MEC), diethyl carbonate (DEC), etc.), γ-butyrolactone (γ-BL), ethyl acetate (EA), and the like. In addition, organic solvents such as ethers (e.g., 1,3-dioxolane, 1,2-dimethoxyethane, etc.), sulfur compounds (e.g., sulfolane), nitrogen-containing compounds, silicon-containing compounds, fluorine-containing compounds, phosphorus-containing compounds, and the like may be used alone or in combination with a lithium salt dissolved therein.

Examples of the lithium salt to be dissolved in the organic electrolyte solution include $LiPF_6$, $LiC_nF_{2n+1}SO_3$ (n>1), $LiClO_4$, $LiBF_4$, $LiAsF_6$, $(C_nF_{2n+1}SO_2)(C_mF_{2m+1}SO_2)NLi_{(m,n \geq 1)}$, $(RfOSO_2)_2NLi$ (Rf is an alkyl group containing halogen including two or more carbon atoms, and may be different or bonded to each other. For example, Rf may be bonded in a polymer form as in $(CH_2(CF_2)_4CH_2OSO_2N(Li)SO_2O)_n$(n: integer)). These lithium salts generally are dissolved in the above organic electrolyte solution in an amount of 0.1 to 2 mol/$dm^3$. There is no particular limit to the kind of the lithium salts. However, $LiPF_6$ and fluorine-containing organic lithium salts including two or more carbon atoms are desirable.

As a positive active material, for example, a lithium cobalt oxide such as $LiCoO_2$, a lithium manganese oxide such as $LiMn_2O_4$, a lithium nickel oxide such as $LiNiO_2$, a metal oxide such as manganese dioxide, vanadium pentoxide, and chromium oxide, or a metal sulfide such as titanium disulfide and molybdenum disulfide is used. Furthermore, a positive electrode is obtained by appropriately adding a conductive auxiliary agent and a binder such as polyvinylidene fluoride to a positive active material to prepare a positive mixture, and molding the positive mixture with a current collector such as aluminum foil as a core material. As the positive active material, in particular, those which exhibit a voltage of 4.2 V or more on the basis of a Li electrode when charged, such as $LiNiO_2$, $LiCoO_2$, and $LiMn_2O_4$, are desirable. A lithium complex oxide in which an open-circuit voltage exhibits 4.3 V or more on the basis of Li after completion of charging is used more desirably. $LiCoO_2$ or $LiNiO_2$ is used most desirably as the positive active material, and a different type of element may be substituted for a part thereof.

In the present embodiment, even in combination with a positive electrode having a large surface area, a battery does not expand, which is more advantageous compared with the use of conventional cyclohexylbenzene. Furthermore, the surface area of the positive electrode is desirably 0.4 $m^2$/g or more, and more desirably 0.5 $m^2$/g or more. Furthermore, the surface area of the positive electrode is desirably 1 $m^2$/g or less, and more desirably 0.7 $m^2$/g or less. The reason for this is as follows: when the surface area becomes too large, the reactivity with an electrolyte solution tends to increase.

Various kinds of conductive auxiliary agents for a positive electrode can be used. In particular, a carbon material is used preferably. Furthermore, the content of the auxiliary agent preferably is 5% by mass or less with respect to the total positive mixture (mixture of a positive active material, a conductive auxiliary agent, and a binder). When the content of a carbon material as an auxiliary agent in a positive mixture exceeds 5% by mass, there is a possibility that the carbon material is likely to generate gas due to the reaction with a solvent of an electrolyte solution in a charged state. Therefore, the content of the carbon material as the conductive auxiliary agent is preferably 3% by mass or less, and more preferably 2.5% by mass or less in a positive mixture. On the other hand, when the content of the conductive auxiliary agent is too small, the conductivity of the positive electrode is decreased to degrade battery characteristics. Therefore, the content of the conductive auxiliary agent is preferably 1% by mass or more, more preferably 1.5% by mass or more, and most preferably 2% by mass or more in a positive mixture.

There is no particular limit to the kind of the carbon material of the conductive auxiliary agent. When a material such as carbon black having low crystallinity is used, the expansion of a battery during storage at a high temperature can be suppressed, which is preferable. Furthermore, it also is preferable that a carbon material having high crystallinity (e.g., a graphite carbon material) is partially used with a carbon material having low crystallinity, conductivity is enhanced, since the use amount of the auxiliary agent can be reduced. Thus, in the case where a carbon material having low crystallinity and a carbon material having high crystallinity are used as conductive auxiliary agents, the amount of a carbon material having low crystallinity is preferably 50% by mass or more, and is more preferably 70% by mass or more with respect to the total conductive auxiliary agent. Furthermore, the amount of the carbon material is preferably 95% by mass or less, and more preferably 80% by mass or less. Crystallinity is determined generally as follows: a carbon material in which a plane interval of a (002) plane of crystal is larger than 0.345 nm is considered to have low crystallinity. In the case where it is difficult to determine the crystallinity, a carbon material in which a half-width of a peak of 1540 to 1600 $cm^{-1}$ of a Raman spectrum is 100 $cm^{-1}$ or more is considered to have low crystallinity.

Furthermore, a negative electrode is obtained by adding a binder and a conductive material if required to a carbon material, or a metal oxide or a metal nitride in which Li can be inserted, dispersing the mixture in a solvent, and coating a current collector such as a copper foil with the resultant dispersion, followed by drying, to obtain a molding. Examples of the metal oxide in which Li can be inserted include a metal compound containing Sn and Si, such as $SnO_x$, $SiO_x$, and the like. Furthermore, examples of the metal nitride include $Li_{2.6}Co_{0.4}N$ and the like.

A thin separator is preferable because energy density can be increased. The thickness of the separator is desirably 20 μm or less. In view of safety, it is desirable that the thickness is set to be 10 μm or more. When the porosity of the separator is too large, the effect of the compounds A and B may be degraded. Therefore, the porosity of the separator is desirably 42% or less, more desirably 40% or less, and most desirably 38% or less. On the other hand, when the porosity is too small, high rate characteristics and the like may be degraded. Therefore, the porosity is desirably 30% or more, more desirably 33% or more, and most desirably 35% or more.

When the air-permeability of the separator is too small, the effect of the compounds A and B may be degraded. Therefore, the air-permeability is desirably 200 or more, and more desirably 300 or more. On the other hand, when the air-permeability is too large, characteristics may be degraded. Therefore, the air-permeability is desirably 500 or less, and more desirably 400 or less.

Furthermore, regarding the shape of a battery, the effect of the present invention is exhibited most effectively in a laminated battery and a prismatic battery. However, the present invention is applicable to various kinds of battery shapes such as a cylindrical battery, a button battery, and a coin-type battery.

Furthermore, the portable equipment in the present specification refers to portable electric equipment using a non-aqueous secondary battery, such as a mobile telephone, a notebook computer, a PDA, small medical equipment, and the like. Electronic equipment in which a charging current exhibits 0.6 A or more is particularly desirable, since the reliability of such equipment is enhanced in combination with the non-aqueous secondary battery of the present embodiment.

Next, the present invention will be described specifically by way of examples. It should be noted that the present invention is not limited to only the following examples.

EXAMPLE 1

An electrolyte solution of the present example was prepared as follows. First, 1.2 mol/$dm^3$ of $LiPF_6$ was dissolved in a mixed solvent of EC and MEC (volume ratio 1:2). Furthermore, 5% by mass of fluorobenzene (FB) as a compound A and 0.1% by mass of biphenyl (BP) as a compound B were dissolved in the mixed solvent to prepare an electrolyte solution in which the content of BP with respect to FB was 2% by mass.

Next, a positive electrode was prepared as follows. First, 2.0 parts by mass of carbon black and 0.5 parts by mass of graphite (Trade Name "KS-6", produced by Lonza Inc.) were added to 93.5 parts by mass of $LiCoO_2$ having a surface area of 0.5 $m^2$/g, followed by mixing. The resultant mixture was added to a solution in which 4 parts by mass of polyvinylidene fluoride was previously dissolved in N-methyl pyrrolidone, followed by mixing, whereby a paste containing a positive mixture was prepared. Both sides of a positive electrode current-collector made of an aluminum foil with a thickness of 15 μm were coated with the paste containing a positive mixture thus obtained, followed by drying, to form a positive mixture layer. Thereafter, the positive mixture layer was subjected to pressure forming by a roller press. Then, the positive mixture layer was cut to a predetermined size, and a lead was welded thereto to produce a band-shaped positive electrode. In the positive electrode, a portion to be an inner surface side of an innermost circumferential portion not opposed to a negative electrode, in an electrode layered body with a winding configuration in which the positive electrode thus produced was wound with a negative electrode via a separator, was not coated with the paste containing a positive mixture. The content of conductive auxiliary agents (carbon black and graphite) in the above-mentioned positive mixture was 2.5% by mass.

Furthermore, a negative electrode was prepared as follows. First, 95 parts by mass of a meso carbon microbeads burned substance were added to a solution in which 5 parts by mass of polyvinylidene fluoride was previously dissolved in N-methyl pyrrolidone, followed by mixing, to prepare a paste containing a negative mixture. Both sides of a negative electrode current-collector made of a copper foil with a thickness of 10 μm were coated with the paste containing a negative mixture thus obtained, followed by drying, to form a negative mixture layer. Thereafter, the negative mixture layer was subjected to pressure forming by a roller press. Then, the negative mixture layer was cut to a predetermined size, and a lead was welded thereto to produce a band-shaped negative electrode. In the negative electrode, an outer surface side of an outermost circumferential portion not opposed to the positive electrode, in an electrode layered body with a winding configuration in which the negative electrode thus produced was wound with the positive electrode via a separator, was not coated with the paste containing a negative mixture.

Then, the positive electrode and the negative electrode were layered via a separator made of microporous polyethylene film with a thickness of 20 μm, a porosity of 37%, and an air-permeability of 400 seconds/100 $cm^3$, and wound in a spiral shape. Thereafter, the resultant layered body was pressed so as to be flat to obtain an electrode layered body with a flat winding configuration. Then, the electrode layered body was provided with an insulating tape, and inserted in a prismatic battery case with an outer size of a thickness (depth) of 4 mm, a width of 30 mm, and a height of 48 mm. The electrode layered body was welded to leads and laser-welded to an opening end portion of the battery case of a cover plate for sealing. The electrolyte solution was injected to the battery case through an injection port for an electrolyte solution provided at the cover plate for sealing. After the electrolyte solution penetrated sufficiently to the separator and the like, the injection port for an electrolyte solution was sealed to form an enclosed state. Then, precharging and aging were performed to produce a prismatic non-aqueous secondary battery having a configuration as shown in FIG. 1 was produced.

Figure 2:
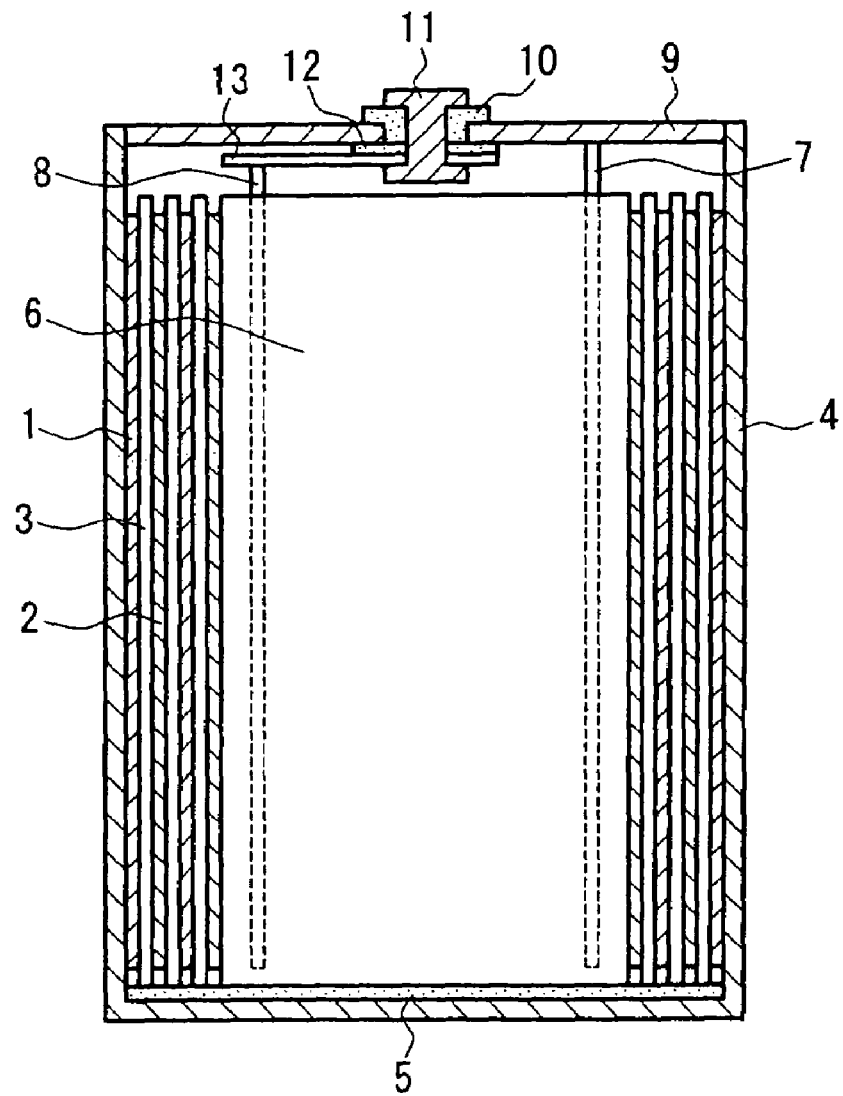
FIG. 2 is a vertical cross-sectional view taken along an A-A line of the non-aqueous secondary battery shown in FIG. 1

FIG. 1 is a plane view schematic showing an example of the non-aqueous secondary battery according to the present invention. FIG. 2 is a vertical cross-sectional view taken along a line A-A of the non-aqueous secondary battery shown in FIG. 1. In FIG. 2, a positive electrode (1) and a negative electrode (2) are wound in a spiral shape via a separator (3) as described above, pressed so as to be flat, and accommodated in a prismatic battery case (4) as an electrode layered body with a flat winding configuration together with the electrolyte solution. In FIG. 2, for simplicity, a metal foil as a current collector, an electrolyte solution, and the like used for producing the positive electrode (1) and the negative electrode (2) are not shown.

The battery case (4) is made of an aluminum alloy and is to be an outer shell of a battery. The battery case (4) also functions as a positive terminal. Furthermore, an insulator (5) made of a polytetrafluoroethylene sheet is placed on a bottom of the battery case (4). A positive lead (7) and a negative lead (8) connected to each one end of the positive electrode (1) and the negative electrode (2) are drawn from the electrode layered body (6) with a flat winding configuration comprised of the positive electrode (1), the negative electrode (2), and the separator (3). Furthermore, a terminal (11) made of stainless steel is attached to a cover plate (9) made of an aluminum alloy sealing an opening of the battery case (4) via an insulating packing (10) made of polypropylene, and a lead plate (13) made of stainless steel is attached to the terminal (11) via an insulator (12). Furthermore, the cover plate (9) is inserted into the opening of the battery case (4), and connecting portions of the cover plate (9) and the battery case (4) are welded, whereby the opening of the battery case (4) is sealed, and the inside of the battery is enclosed.

As described above, a prismatic non-aqueous secondary battery of the present example with a capacity of 600 mAh was produced.

In the battery of Example 1, the battery case (4) and the cover plate (9) function as positive terminals by directly welding the positive lead (7) to the cover plate (9), and the terminal (11) functions as a negative terminal by welding the negative lead (8) to the lead plate (13), and bringing the negative lead (8) and the terminal (11) into conduction via the lead plate (13). The positive electrode and the negative electrode may be reversed depending upon the material of the battery case (4).

EXAMPLE 2

A prismatic non-aqueous secondary battery of the present example was produced in the same way as in Example 1, except that 2% by mass of 1,3-propanesultone (PS) further was dissolved in the electrolyte solution prepared in Example 1.

COMPARATIVE EXAMPLE 1

A prismatic non-aqueous secondary battery was produced in the same way as in Example 2, except that biphenyl (BP) was not added to the electrolyte solution.

COMPARATIVE EXAMPLE 2

A prismatic non-aqueous secondary battery was produced in the same way as in Example 2, except that fluorobenzene (FB) was not added to the electrolyte solution.

COMPARATIVE EXAMPLE 3

A prismatic non-aqueous secondary battery was produced in the same way as in Example 2, except that fluorobenzene (FB) was not added to the electrolyte solution, and 5% by mass of biphenyl (BP) was added.

Next, the batteries in Examples 1, 2 and Comparative Examples 1 to 3 were discharged to 3.0 V at 1 CmA at room temperature (20° C.), charged to 4.2 V at 1 CmA, charged at 4.2 V, and after the total charging time reached 2.5 hours, discharged to 3.0 V at 0.2 $C_m$A. The positive electrode potential when charged to 4.2 V was 4.3 V on the basis of Li.

Then, an overcharging safety test and a storage test were performed as follows. In the overcharging safety test, the batteries were charged to 4.2 V at 1 CmA, charged at 4.2 V, and after the total charging time reached 2.5 hours, overcharged at 0.4 to 0.6 A with an upper limit voltage set at 6 V. The minimum current value at which the surface temperature of each battery became 135° or more was measured. Table 1 shows the results as an overcharging safety current value.

Furthermore, in the storage test, the batteries were charged to 4.2 V at 1 CmA, charged at 4.2 V, and after the total charging time reached 2.5 hours, discharged to 3.0 V at 1 CmA. Thereafter, the batteries were charged to 4.2 V at 1 CmA, charged at 4.2 V, and after the total charging time reached 2.5 hours, the thickness of each battery in a charged state was measured. Thereafter, each battery was stored in a thermostatic controlled environment at 60° C. for 20 days, and then, the thickness of each battery was measured. The change ratio (%) in thickness of a battery after storage was obtained. Table 1 shows the results.

Change ratio (%) in thickness=[(Thickness after storage)−(Thickness before storage)]÷(Thickness before storage)×100

The oxidation potential of an additive was obtained by a potential step method, using a platinum wire with a diameter of 0.3 mm for a working electrode, and metal lithium for a counter electrode and a reference electrode. As a measurement system, a charging/discharging apparatus "TOSCAT-3100U" (Trade Name) produced by Toyo System was used. Based on measurement conditions, charging at a constant voltage of 3 V or 4V on the basis of lithium with an upper limit current 0.2 mA was performed, and when a current value decreased to 5 µA or less, the voltage was increased to a subsequent value. An electrolyte solution was obtained by dissolving 1.2 mol/cm$^3$ of LiPF$_6$ in a mixed solvent of EC and MEC (volume ratio 1:2), and 1% by mass of an additive was dissolved in the resultant solution. A potential at which a current value did not fall to 5 µA or less was determined as an oxidation potential. An increase potential width is 0.03 V. As a result, the oxidation potential of fluorobenzene was 5.10 V, and the oxidation potential of biphenyl was 4.54 V

TABLE 1

|  | Overcharging safety current value | Change ratio in thickness of battery after storage | Characteristics of electrolyte solution | | |
| --- | --- | --- | --- | --- | --- |
| Example 1 | 0.6 A or more | 8% | FB 5%, | BP 0.1% | |
| Example 2 | 0.6 A or more | 6% | FB 5%, | BP 0.1%, | PS 2% |
| Comparative Example 1 | 0.5 A | 6% | FB 5%, | | PS 2% |
| Comparative Examples 2 | 0.4 A | 6% | | BP 0.1%, | PS 2% |
| Comparative Example 3 | 0.6 A or more | 10% or more | | BP 5%, | PS 2% |

It is understood from the results shown in Table 1 that the batteries in Examples 1, 2 containing the compounds A and B in the electrolyte solution were suppressed from expanding during storage while enhancing overcharging safety. Furthermore, in Example 2 in which the compound having a $—SO_2$ bond in the electrolyte solution, storage reliability was enhanced more than that in Example 1.

On the other hand, in the batteries in Comparative Examples 1, 2 containing no compound A or B in the electrolyte solution, overcharging safety was insufficient. Furthermore, in Comparative Example 3 in which the compound A was not contained in the electrolyte solution and the content of the compound B was large, the battery during storage expanded considerably.

Furthermore, even when the battery in Example 2 was used as a power source for a mobile telephone, and discharged to 6 V at 0.6 A while a protection circuit was not allowed to be operated, the surface temperature of the battery did not increase beyond 135° C. On the other hand, in Comparative Example 1, the surface temperatures of some batteries increased to 135° C. or higher.

INDUSTRIAL APPLICABILITY

As described above, according to the present invention, an electrolyte solution contains a compound A in which a halogen group is bonded to a benzene ring, and a compound B oxidized at a potential lower than that of the compound A, which is at least one selected from an aromatic compound and a heterocyclic compound, whereby overcharging safety can be improved, and storage reliability can be ensured.

The invention claimed is:

1. A non-aqueous secondary battery comprising a positive electrode, a negative electrode, a non-aqueous electrolyte solution, and a separator,
   wherein the non-aqueous electrolyte solution contains a compound having a $—OSO_2$ bond, a compound A in which a halogen group is bonded to a benzene ring and a compound B oxidized at a potential lower than that of the compound A,
   the compound B is at least one selected from an aromatic compound and a heterocyclic compound,
   the positive electrode contains a positive mixture, the positive mixture contains a carbon material as a conductive auxiliary agent, and a content of the carbon material with respect to the total positive mixture is not more than 5% by mass, and
   the non-aqueous secondary battery is a prismatic battery.

2. The non-aqueous secondary battery according to claim 1, wherein a content of the compound A with respect to the total non-aqueous electrolyte solution is 1% by mass to 15% by mass, and a content of the compound B with respect to the total non-aqueous electrolyte solution is 0.005% by mass to 3% by mass.

3. The non-aqueous secondary battery according to claim 1, wherein the carbon material contains a carbon material having low crystallinity.

4. The non-aqueous secondary battery according to claim 1, wherein the content of the carbon material with respect to the total positive mixture is not more than 3% by mass.

5. The non-aqueous secondary battery according to claim 1, wherein the content of the carbon material with respect to the total positive mixture is not more than 2.5% by mass, and the battery includes an electrode layered body with a flat winding configuration.

6. The non-aqueous secondary battery according to claim 1, wherein a porosity of the separator is 30% to 42%.

7. The non-aqueous secondary battery according to claim 1, wherein an air-permeability of the separator is 200 seconds/100 $cm^3$ to 500 seconds/100 $cm^3$.

8. The non-aqueous secondary battery according to claim 1, wherein a content of the compound A with respect to the total non-aqueous electrolyte solution is 1% by mass to 10% by mass.

9. The non-aqueous secondary battery according to claim 1, wherein a content of the compound B with respect to the total non-aqueous electrolyte solution is 0.005% by mass to 0.5% by mass.

10. The non-aqueous secondary battery according to claim 1, wherein a content of the compound A with respect to the total non-aqueous electrolyte solution is 1% by mass to 10% by mass, and a content of the compound B with respect to the total non-aqueous electrolyte solution is 0.005% by mass to 0.5% by mass.

11. Portable equipment comprising a non-aqueous secondary battery,
   wherein the non-aqueous secondary battery includes a positive electrode, a negative electrode, and a non-aqueous electrolyte solution,
   the non-aqueous electrolyte solution contains a compound having a $—OSO_2$ bond, a compound A in which a halogen group is bonded to a benzene ring and a compound B oxidized at a potential lower than that of the compound A,
   the compound B is at least one selected from an aromatic compound and a heterocyclic compound, and
   the non-aqueous secondary battery is a prismatic battery.

12. The portable equipment according to claim 11, wherein the non-aqueous secondary battery is charged at at least 0.6 A during charging.

13. The portable equipment according to claim 11, wherein a content of the compound A with respect to the total non-aqueous electrolyte solution is 1% by mass to 15% by mass, and a content of the compound B with respect to the total non-aqueous electrolyte solution is 0.005% by mass to 3% by mass.

14. The portable equipment according to claim 11, wherein the positive electrode contains a positive mixture, the positive mixture contains a carbon material as a conductive auxiliary agent, and a content of the carbon material with respect to the total positive mixture is not more than 5% by mass.

15. The portable equipment according to claim 14, wherein a content of the carbon material with respect to the total positive mixture is not more than 3% by mass.

16. The portable equipment according to claim 14, wherein the carbon material contains a carbon material having low crystallinity.

17. The portable equipment according to claim 14, wherein a content of the carbon material with respect to the total positive mixture is not more than 3% by mass, and the carbon material contains a carbon material having low crystallinity in a ratio of not more than 50% by mass with respect to the total conductive auxiliary agent.

* * * * *